United States Patent Office 3,106,237
Patented Oct. 8, 1963

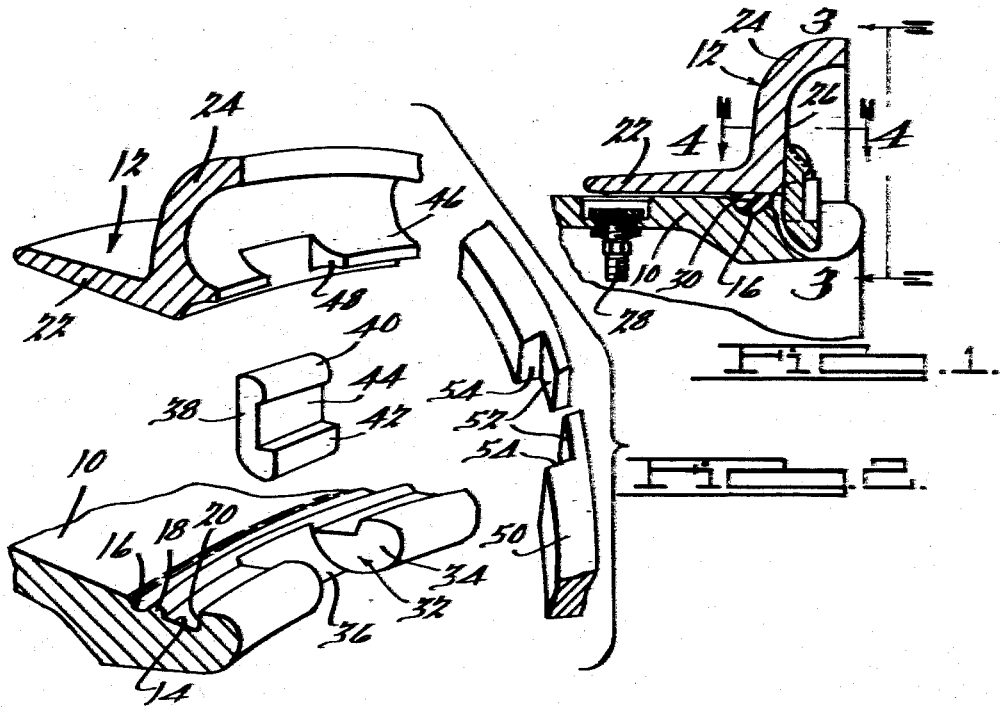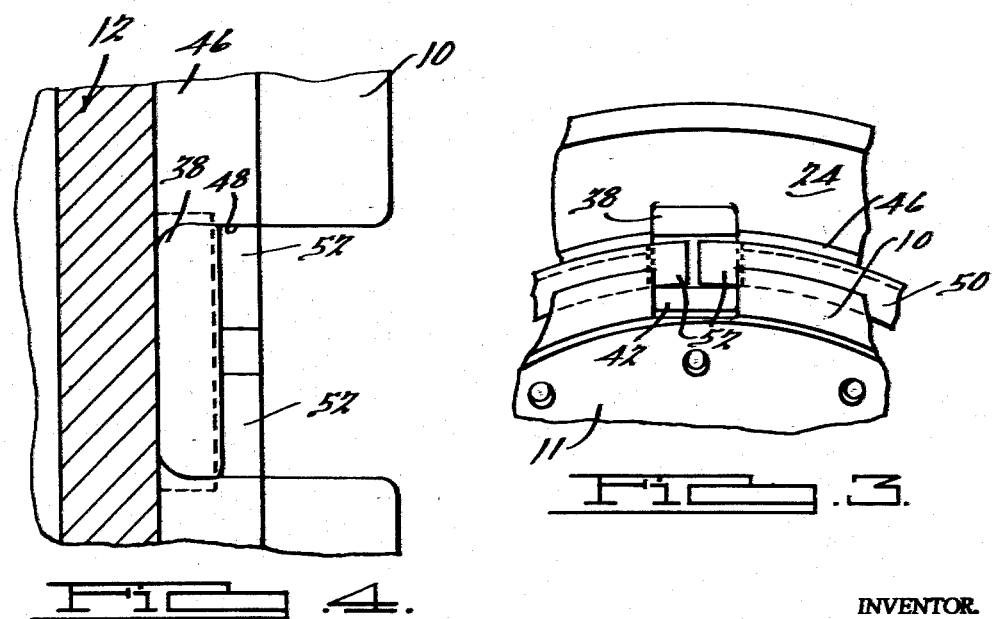

3,106,237
WHEEL RIM WITH REMOVABLE SIDE RING
Romayne E. Holmes, Jr., Madison Heights, Mich., assignor to Kelsey-Hayes Company, Romulus, Mich., a corporation of Delaware
Filed Jan. 9, 1962, Ser. No. 165,074
8 Claims. (Cl. 152—410)

This invention relates to wheel rims and particularly to a wheel rim having a removable side ring for use on trucks, construction equipment and other vehicles having large tires.

It is an object of the present invention to provide a rim assembly having a removable side ring which incorporates means for positively driving the side ring in rotation with the rim base, thereby eliminating angular slippage of the side ring on the rim base.

It is another object of the present invention to provide a wheel rim assembly of the above character utilizing a driving lug forming a driving connection between the rim base and the side ring and wherein the driving lug is secured in place in the assembly in a simple, convenient and positive manner.

It is another object of the present invention to provide a rim assembly of the above character which is strong, reliable in operation and inexpensive of manufacture.

These and other objects of the present invention will become apparent from the following detailed description, taken in conjunction with the accompanying drawings wherein:

FIGURE 1 is a fragmentary cross-sectional view of a wheel rim assembly embodying the principles of the present invention;

FIG. 2 is an exploded perspective view of the structure of FIG. 1, except for the O-ring;

FIG. 3 is a sectional view of the structure of FIG. 1, taken along the line 3—3 thereof; and FIG. 4 is a sectional view of the structure of FIG. 1, taken along the line 4—4 thereof.

Referring now to the drawings, the wheel rim assembly of the present invention will be seen to include a rim base 10, which, at its inboard side, has the standard integral side flange and bead seat (not shown). A removable side ring 12 is positioned at the outboard side of the rim. During use, the side ring 12 is locked in position, but it may be detached to facilitate removal of the tire adapted to be carried by the rim. The rim base 10 has an annular gutter 14 formed therein adjacent its outboard edge, while an annular O-ring groove 16 is formed in the rim base 10 in a location spaced slightly axially inwardly of the gutter 14. As may be seen in FIG. 2, a rib 18 separates the groove 16 from the gutter 14. The gutter 14 has a radially extending annular shoulder 20 that faces in an inboard direction toward the rib 18.

The side ring is provided with a generally cylindrical bead seat portion 22 concentrically surrounding the rim base 10 and a radially outwardly extending flange portion 24 projecting from the outboard side of the bead seat portion 22. The flange 24 has an outer wall 26 facing in an outboard direction. One bead of the tire carried by the rim is adapted to rest on the bead seat portion 22, while the side wall of the tire engages the flange portion 24. The rim illustrated herein is intended to carry a tubeless tire and inflationary air pressure for the tire is admitted through a valve 28 mounted in the rim base 10. A seal member in the form of a rubber O-ring 30 is positioned in the groove 16 for engagement with the radially inner surface of the side ring 12, thereby preventing the loss of inflationary air pressure through the space between the side ring 12 and the rim base 10. As in the case of all rims having removable side rings, inflationary air pressure will cause the side wall of the tire to exert an axially outward force on the side ring 12 attempting to displace the side ring from the rim base. However, the side ring is held on the rim base by a lock ring, as will be more fully explained hereinafter.

The side ring 12 and the rim base 10 are locked together for co-rotation by structure which includes a slot 32 formed in the rim base 10 and extending inwardly from the outboard edge thereof into the gutter 14. The slot 32 has opposite side walls or shoulders 34 and a radially inwardly and axially outwardly sloping rear wall 36. A driving lug 38 is disposed partly in the slot 36 and projects radially outwardly therefrom. The lug 38 has a rib 40 at its radially outer end an a rib or shoulder portion 42 at its radially inner side. A face 44 is formed between the ribs 40 and 42 and defines the bottom of a recess or circumferentially extending groove between the ribs 40 and 42. The side ring 12 has an annular axially outwardly extending rib 46 provided with an axially outwardly open slot 48 disposed adjacent the slot 32 and of a width to receive the radially outer portion of the driving lug 38 snugly therein.

A split lock ring 50 will be seen to seat in the gutter 14. The ring 50 is formed with a pair of adjacent portions 52 on opposite sides of the split or separation therein. The portions 52 are of narrow axial thickness and extend toward one another from oppositely facing shoulders 54 arranged to engage the driving lug 38 on circumferentially opposite sides thereof. The lock ring portions 52 lie flatly against the lug face 44 and hold the lug 38 against the wall 26 of the side ring 12. In this position, the lug 38 is securely held against movement out of the slot 32. Radially outward movement of the lug is prevented by the engagement of the rib 42 with the underside of the lock ring portions. Radially inward movement of the lug is restrained by the wall 36, as well as by the engagement of the rib 40 with the radially outer sides of the lock ring portions 52. Circumferential movement of the lug 38 on the rim base is, of course, prevented by the slot side walls 34. With the lug in position, attempted rotation of the side ring on the rim base 10 will cause one of the side walls of the slot 48 to contact the lug 38, whereupon further rotation of the side ring relative to the rim base is prevented.

The assembly of the lug 38 in position is extremely simple and only requires the expansion of the lock ring to spread the portions 52 sufficiently far apart to permit the lug to be inserted therebetween. Of course, the side ring 12 is first sleeved over the rim base when the tire is deflated and, with the side ring axially inward of its normal position, the lock ring 50 is expanded to a diameter sufficient to enable it to be positioned over the rim and dropped into the gutter 14. When the tire is subsequently inflated, the side ring will be forced into abutment with the inboard side of the lock ring.

While it will be apparent that the preferred embodiment herein illustrated is well calculated to fulfill the objects above stated, it will be appreciated that the invention is susceptible to modification, variation and change without departing from the proper scope or fair meaning of the subjoined claims.

What is claimed is:
1. A rim construction including a rim base having a gutter adjacent one edge thereof and a slot extending from said one edge into said gutter, a continuous side ring on said rim base having an axially projecting portion provided with a slot adjacent the slot in said base, a separate driving element having portions disposed in both of said slots to prevent relative rotation between said side ring and said rim base, and a split lock ring seated in said gutter to prevent movement of said side ring axially off of said rim, said lock ring having at least one portion adjacent the split therein engaging said driving element on the side thereof opposite from said side ring to prevent displacement of said driving element from said slot.

2. A rim construction including a rim base having a gutter adjacent one edge thereof and a slot extending axially inwardly from the outboard edge of said rim into said gutter, a continuous side ring on said base having an axially projecting rib extending annularly about the outboard side thereof, said rib being provided with a slot therein which is open in an outboard direction, a separate driving element having portions disposed in both of said slots to prevent relative rotation between said side ring and said rim, and a split lock ring seated in said gutter to prevent movement of said side ring axially off of said rim, said lock ring having portions adjacent the split therein engaging said driving element on the outboard side thereof holding said driving element against an outboard facing surface of said side ring and being operable to prevent displacement of said driving element from said slots.

3. A rim construction including a rim base having a gutter adjacent the outboard edge thereof and a slot extending axially inwardly from said outboard edge into said gutter, a continuous side ring on said rim base having a pair of spaced shoulder portions defining an opening therebetween arranged in radial alignment with the slot in said rim base, a separate driving element having a portion disposed in the slot of said rim base and a portion disposed between the shoulder portions of said side ring to prevent relative rotation between said ring and said rim, and a split lock ring seated in said gutter to prevent movement of said side ring axially off of said rim, said lock ring having at least one portion adjacent the split therein engaging said driving element on the outboard side thereof holding said driving element against an outboard facing surface of said side ring and being operable to prevent radial movement of said driving element in at least one direction.

4. The structure set forth in claim 1 in which said driving element has a rib adjacent the radially inner edge thereof engageable with the radially inner side of said lock ring.

5. The structure set forth in claim 1 in which said driving element has a rib adjacent the radially outer edge thereof engageable with the radially outer side of said split lock ring.

6. The structure set forth in claim 1 in which said rim base has an axially outwardly extending surface adjacent the slot in said rim base which is engageable with said driving element to limit axially inward movement of said driving element out of said rim base slot.

7. A rim construction including a rim base having a gutter adjacent one edge thereof and a slot extending axially inwardly from the outboard edge of said rim base into said gutter, a continuous side ring on said base having an axially projecting rib extending annularly about the outboard side thereof, said rib being provided with a slot therein which is open in an outboard direction, a separate driving element having portions disposed in both of said slots to prevent relative rotation between said side ring and said rim base, said driving element being provided with a circumferentially extending groove on the outboard side thereof, and a split lock ring seated in said gutter to prevent movement of said side ring axially off of said rim, said lock ring having at least one portion of reduced axial thickness extending into said groove and a pair of oppositely facing shoulders on opposite sides of said driving element disposed adjacent opposite sides of said driving element.

8. A rim construction including a rim base having a gutter adjacent the outboard edge thereof and a slot extending axially inwardly from said outboard edge into said gutter, a continuous side ring on said rim base having an axially outwardly projecting annular rib extending therearound and provided with a slot which is open to the outboard edge thereof, a separate driving element having portions disposed in both of said slots to prevent relative rotation between said side ring and said rim base, a split lock ring seated in said gutter to prevent movement of said side ring axially off of said rim, said lock ring having at least one portion of reduced axial thickness adjacent the split therein engaging said driving element on an outboard facing surface thereof and oppositely facing shoulders on opposite sides of said driving element, a rib on said driving element adjacent the radially inner edge thereof engageable with said lock ring portion of reduced axial thickness for limiting radially outward movement of said driving element, and means for limiting radially inward movement of said driving element relative to said lock ring.

References Cited in the file of this patent

UNITED STATES PATENTS

| | | |
|---|---|---|
| 959,236 | Ley | May 24, 1910 |
| 2,105,829 | Woodward | Jan. 18, 1938 |
| 3,003,538 | Gerbeth | Oct. 10, 1961 |
| 3,043,358 | Scott | July 10, 1962 |

FOREIGN PATENTS

| | | |
|---|---|---|
| 1,067,000 | France | Jan. 27, 1954 |